United States Patent
Adolphs et al.

(10) Patent No.: US 10,011,930 B2
(45) Date of Patent: Jul. 3, 2018

(54) NON-WEFT UNIDIRECTIONAL FIBER-REINFORCED FABRICS

(71) Applicant: OCV Intellectual Capital, LLC, Toledo, OH (US)

(72) Inventors: Georg Adolphs, Sabadell (ES); Patrick Moireau, Curienne (FR); Jerome Francois, Aix les Baines (FR); Tom Wassenberg, Lunne (DE); David Hartman, Granville, OH (US); Frank MacDonald, Granville, OH (US); Patrick Haller, Columbus, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 32 days.

(21) Appl. No.: 15/109,505
(22) PCT Filed: Jan. 12, 2015
(86) PCT No.: PCT/US2015/011029
§ 371 (c)(1),
(2) Date: Jul. 1, 2016
(87) PCT Pub. No.: WO2015/156861
PCT Pub. Date: Oct. 15, 2015

(65) Prior Publication Data
US 2016/0355962 A1    Dec. 8, 2016

Related U.S. Application Data

(60) Provisional application No. 61/925,789, filed on Jan. 10, 2014.

(51) Int. Cl.
*D04H 1/74*     (2006.01)
*B29C 70/22*    (2006.01)
(Continued)

(52) U.S. Cl.
CPC ............ *D04H 1/74* (2013.01); *B29C 70/083* (2013.01); *B29C 70/20* (2013.01); *B29C 70/226* (2013.01);
(Continued)

(58) Field of Classification Search
None
See application file for complete search history.

(56) References Cited

U.S. PATENT DOCUMENTS 6,054,205 A * 4/2000 Newman ............. B28B 19/0092
                                                         428/101
6,503,856 B1 * 1/2003 Broadway ............. B29B 15/122
                                                         442/268
(Continued)

FOREIGN PATENT DOCUMENTS

CN    102535021    7/2012
EP     441519      8/1991
(Continued)

OTHER PUBLICATIONS

International Search Report and Written Opinion from PCT/US15/011029 dated Nov. 24, 2015.
(Continued)

*Primary Examiner* — David Sample
*Assistant Examiner* — Donald M Flores, Jr
(74) *Attorney, Agent, or Firm* — Calfee, Halter & Griswold LLP

(57) ABSTRACT

A non-weft, unidirectional fabric is provided that includes a plurality of substantially parallel reinforcement fiber bundles. The reinforcement fiber bundles have a first surface and an opposing second surface. The non-weft, unidirectional fabric further includes at least one of a non-woven veil bonded to at least one surface and one or more bands of sprayed adhesive spanning across at least a portion of the width of one of the first and second surfaces of the plurality of substantially parallel reinforcement fibers.

16 Claims, 8 Drawing Sheets

(51) Int. Cl.
*B29C 70/20* (2006.01)
*B29C 70/08* (2006.01)
*D04H 1/4218* (2012.01)
*D04H 1/4242* (2012.01)
*D04H 3/04* (2012.01)

(52) U.S. Cl.
CPC ......... *D04H 1/4218* (2013.01); *D04H 1/4242* (2013.01); *D04H 3/04* (2013.01)

(56) References Cited

U.S. PATENT DOCUMENTS

2003/0132543 A1   7/2003   Gardner
2006/0121805 A1   6/2006   Krulic

FOREIGN PATENT DOCUMENTS

| EP | 1027206 | 8/2000 |
| WO | 02/090089 | 11/2002 |
| WO | 2013/019774 | 2/2013 |
| WO | 2014/085409 | 6/2014 |

OTHER PUBLICATIONS

Bronsted et al., "Fatigue damage propagation in unidirectional glass fiber reinforced composites made of a non-crimp fabric", Journal of Composite Materials, Sep. 13, 2009.
Communication pursuant to Article 94(3) EPC from EP Application No. 15742130.6 dated Aug. 8, 2017.
Office action from Chinese Application No. 201580007900.1 dated Feb. 12, 2018.
Office action from European Application No. 15742130.6 dated Feb. 28, 2018.

\* cited by examiner

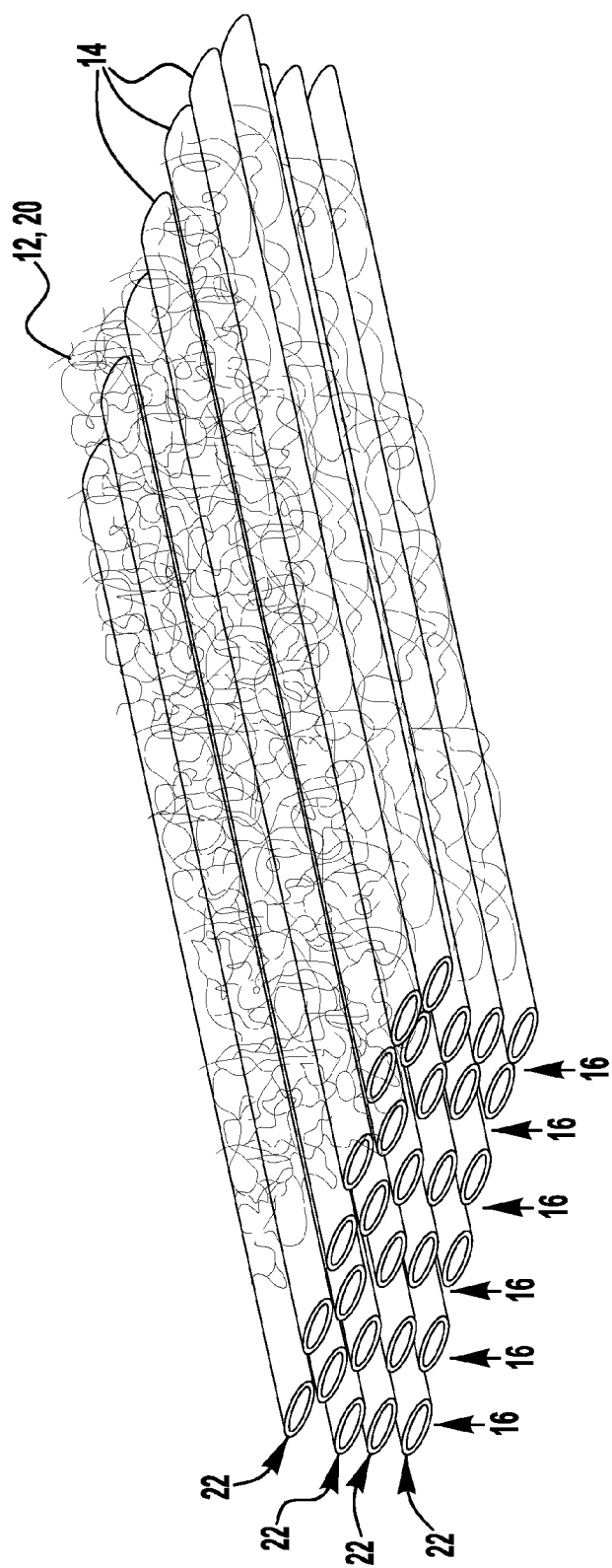

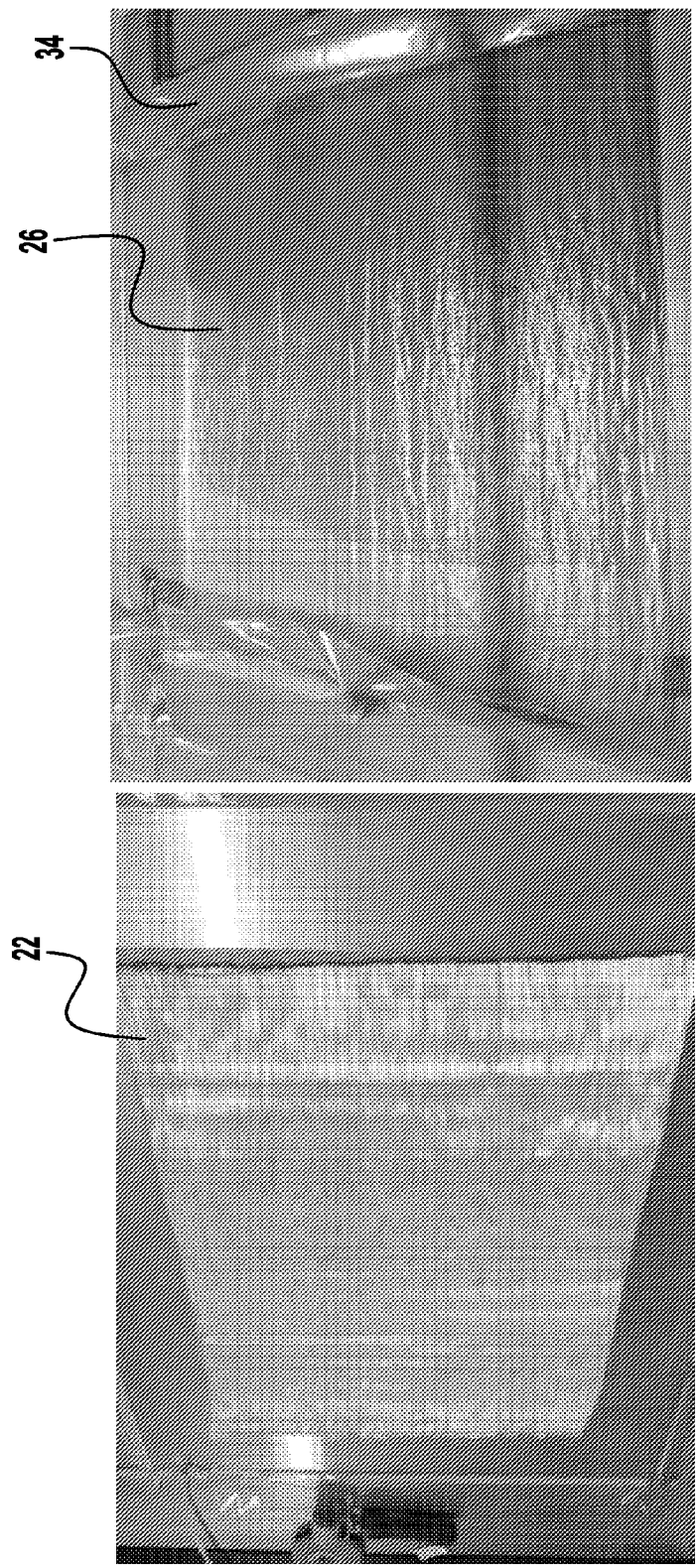

NON-WEFT UNIDIRECTIONAL FIBER-REINFORCED FABRICS

RELATED APPLICATIONS

The present application is the U.S. national stage entry of PCT/US15/11029, filed on Jan. 12, 2015, which claims priority to U.S. provisional application no. 61/925,789, filed on Jan. 10, 2014, both of which are hereby incorporated by reference in their entirety.

FIELD OF THE INVENTION

The general inventive concepts relate to lightweight non-weft, unidirectional fabrics with improved strength and modulus properties.

BACKGROUND

Reinforcement fibers are used in a variety of products. The fibers can be used as reinforcements in products such as plastic matrices, reinforced paper and tape, and woven products. During the fiber forming and collecting process, numerous fibers are bundled together as a strand. Several strands can be gathered together to form a fiber bundle used to reinforce a polymer matrix to provide structural support to products, such as molded plastic products. The strands can also be woven to form a fabric, or can be collected in a pattern as a fabric.

Reinforcing glass strands are conventionally prepared by mechanically drawing molten glass streams flowing by gravity from multiple orifices of bushings filled with molten glass to form filaments which are gathered together into base strands, and then collected. During the drawing of the glass filaments, and before they are gathered together into strands, the glass filaments are often coated with a sizing composition, generally an aqueous sizing composition, using a rotating roller. The sizing composition (also referred to as "size") is traditionally applied during manufacture of the glass filaments to protect the filaments from the abrasion resulting from the rubbing of the filaments at high speed during the forming and subsequent processes, thus acting as lubricant. It also makes it possible to remove or avoid electrostatic charges generated during this rubbing. Additionally, during the production of reinforced composite materials, the size improves the wetting of the glass and the impregnation of the strand by the material to be reinforced.

After the reinforcing fibers are produced, they are frequently processed on looms or other weaving devices to produce woven fabrics. The weaving process traditionally includes both warp yarns, which are the lengthwise or longitudinal yarns, and weft yarns, which transverse the warp yarns and are traditionally inserted over-and-under the warp threads, acting as filler. However, the crimping of the yarns that occurs as the warp and weft yarns cross over and under each other reduces the tensile and the compressive strength of a woven fabric. Additionally, the weft yarns add weight without providing significant additional benefits to the physical properties.

Unidirectional fabrics are fabrics with at least approximately 80% of the total fibers in a single direction, generally in the warp direction, also known as the load direction of the laminate. Accordingly, if a unidirectional fabric includes weft fibers, they generally account for less than 20% of the total fibers in the fabric and provide a backing structure to allow for the knitting/stitching of the fabric, thus providing a stable textile structure.

Weft fibers have traditionally been a necessary component in fabrics, acting as a stabilizer to mechanically bind the unidirectional fiber bundles as a backing and to maintain a distance between the unidirectional fibers, thus generating channels for resin impregnation in vacuum infusion processing. For instance, applications such as the production of wind turbine blades traditionally employ fiber bundles in various orientations that are stitched together, forming a preform. Such preforms include weft fibers that act as a carrier for the load bearing fibers, holding the preform together. The quality of wind turbine blades is determined, at least in part, by both the fatigue in relation to the lifetime of the blade and also the stiffness of the blade. However, weft fibers in a unidirectional laminate have shown to cause increased fatigue and also stiffness degradations over the lifetime of the blade.

SUMMARY

The general inventive concepts are directed to a non-weft, unidirectional fabric including a plurality of substantially parallel reinforcement fibers. In some exemplary embodiments, the non-weft, unidirectional fabric includes at least one of a non-woven veil bonded to at least one surface of the reinforcement fibers or one or more bands of sprayed adhesive spanning across at least a portion of the width of at least one surface of the plurality of substantially parallel reinforcement fibers.

In embodiments including a non-woven veil, the non-woven veil may be a glass veil, a polymer veil, or a mixture thereof.

In some exemplary embodiments the reinforcement fibers comprise one or more of glass and carbon fiber bundles.

In some exemplary embodiments, the polymer veil comprises at least one of polypropylene, polyester, polyamide, and polyurethane filaments In some exemplary embodiments, the non-woven veil is selectively bonded to the single surface by localized heating of the non-woven veil.

In some exemplary embodiments, the non-woven veil is selectively bonded to the surface of the reinforcement fibers by a localized application of an adhesive material.

In some exemplary embodiments, the non-woven veil is formed by one of a melt-blown process, a spun-bond process, a dry-laid process, a wet-blown process, and electrospinning.

In some exemplary embodiments, the reinforcement fiber bundles comprise a plurality of glass or carbon fibers coated with a sizing composition including a polymeric binder, which upon heating, will bond the fiber bundles and also the non-woven veil to the glass or carbon fiber bundles.

The general inventive concepts are additionally directed to a non-weft unidirectional fabric comprising one or more substantially parallel reinforcement fibers. The reinforcement fibers include a plurality of fibers coated with a sizing composition that includes a polymeric binder that is capable of bonding the substantially parallel reinforcement fibers to each other.

In some exemplary embodiments, the sizing composition further includes at least one of a film former, a coupling agent, a surfactant, a dispersant, and a plasticizer.

In some exemplary embodiments, the polymeric binder includes one or more of a polyamide, a polytetrafluoroethylene, a polyvinylchloride, a polyester, a polypropylene, a polyphenylenesulfide, a polyethyleneimine, a polyamideimine, a polyether-etherketone, a polyoxymethylene, a polyethylene, copolymers thereof, and mixtures of the polymers and/or copolymer.

In some exemplary embodiments, the non-weft unidirectional fabric further includes a non-woven veil bonded to at least one surface of the substantially parallel reinforcement fibers or one or more bands of sprayed adhesive spanning across at least a portion of the width of at least one surface of the plurality of substantially parallel reinforcement fibers.

The non-woven veil may be a glass veil, a thermoplastic veil, or a mixture thereof.

The general inventive concepts are further directed to a fiber-reinforced composite including at least one non-weft, unidirectional fabric comprising a plurality of substantially parallel reinforcement fibers, a non-woven veil bonded to at least one surface of the reinforcement fibers or one or more bands of sprayed adhesive spanning across at least a portion of the width of at least one surface of the plurality of substantially parallel reinforcement fibers; and a polymeric matrix material.

In some exemplary embodiments, the non-woven veil is selectively bonded to the surface of the reinforcement fibers by localized heating of the non-woven veil.

In some exemplary embodiments, the non-woven veil is selectively bonded to the surface of the reinforcement fibers by a localized application of an adhesive material.

In some exemplary embodiments, the reinforcement fibers comprise a plurality of glass or carbon fibers coated with a sizing composition including a polymeric binder, which upon heating will bond the fiber bundles and the non-woven veil to the glass or carbon fiber bundles.

In some exemplary embodiments, the composite further includes a non-woven veil bonded to at least one surface of the substantially parallel reinforcement fibers.

Additional features and advantages will be set forth in part in the description that follows, and in part may be obvious from the description, or may be learned by practice of the exemplary embodiments disclosed herein. The objects and advantages of the exemplary embodiments disclosed herein may be realized and attained by means of the elements and combinations particularly pointed out in the appended claims. It is to be understood that both the foregoing summary and the following detailed description are exemplary and explanatory only and are not restrictive of the general inventive concepts as disclosed herein or as claimed.

BRIEF DESCRIPTION OF DRAWINGS

FIG. 4 illustrates a stacked non-weft, unidirectional fabric with channels formed therein for the infusion of a matrix material.

FIG. 5(a) illustrates a 4-ply non-weft unidirectional fabric sample prior to vacuum infusion with a resin.

FIG. 5(b) illustrates a 4-ply non-weft unidirectional fabric sample after undergoing vacuum infusion with a resin.

DETAILED DESCRIPTION

Figure 1:
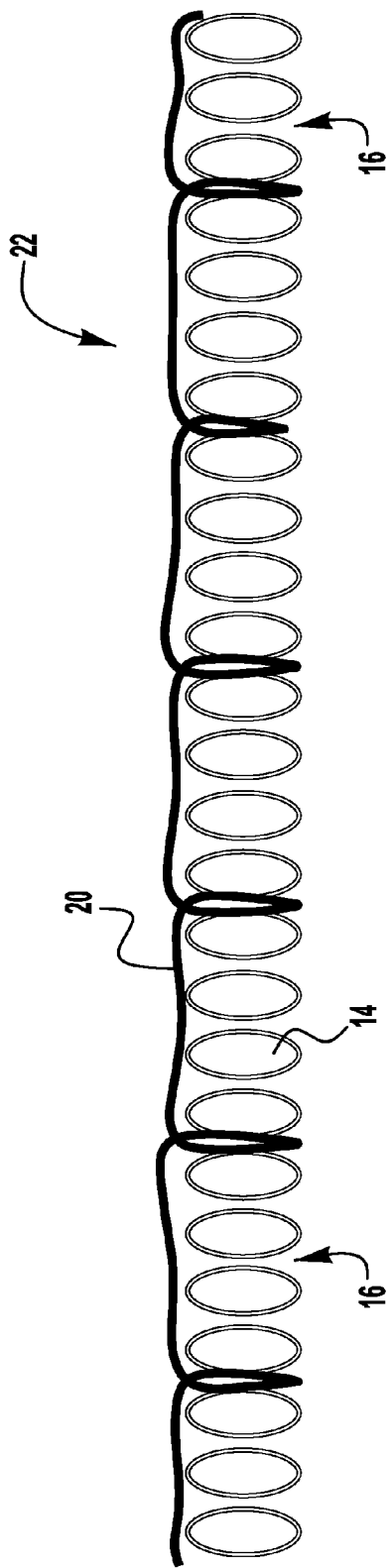
FIG. 1 illustrates channels created between unidirectional fiber bundles coated by a thermoplastic non-woven veil.

Various exemplary embodiments will now be described more fully, with occasional reference to the accompanying drawings. These exemplary embodiments may, however, be embodied in different forms and should not be construed as being limited to the descriptions set forth herein. Rather, these exemplary embodiments are provided so that this disclosure will be thorough and complete, and will convey the general inventive concepts to those skilled in the art.

Unless otherwise defined, all technical and scientific terms used herein have the same meaning as commonly understood by one of ordinary skill in the art to which these exemplary embodiments belong. The terminology used in the description herein is for describing particular exemplary embodiments only and is not intended to be limiting of the exemplary embodiments.

As used in the specification and the appended claims, the singular forms "a," "an," and "the" are intended to include the plural forms as well, unless the context clearly indicates otherwise. All publications, patent applications, patents, and other references mentioned herein or otherwise cited are incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

As used herein, the term "fiber" is defined as a bundle of one or more mono filaments.

As used herein, the term "polymer" includes the term "homopolymer" and "copolymer."

As used herein, the phrase "fiber bundle" refers to a group of about 400 to about 8,000 individual filaments.

As used herein, the phrase "unidirectional fabric" means any fabric that includes at least approximately 80% of the total fibers in a single direction, such as in the load direction, or warp direction, of the laminate.

As used herein, a "non-weft" fabric means fabrics that exclude any reinforcement fibers within one ply that extend the width of the fabric in parallel and have an orientation that varies by 15° or more from the orientation of the unidirectional fibers described above.

As used herein, the term "ply" refers to a monolayer of oriented fibers.

As used herein, the term "channel" refers to the space between adjacent parallel fiber bundles.

The general inventive concepts are directed to non-weft, unidirectional fabrics. Other aspects of the general inventive concepts are directed to reinforced composite products, such as laminates, formed from non-weft, unidirectional fabrics.

In some exemplary embodiments, the non-weft, unidirectional fabrics include one or more reinforcement fiber bundles that may comprise natural or synthetic fibers, yarns, and strands. The reinforcement fiber bundles may be used in continuous or discontinuous form. In some exemplary embodiments, the reinforcement fiber bundles comprise continuous fibers in the form of unbroken filaments, threads, strands, yarns, or rovings.

In some exemplary embodiments, the reinforcement fiber bundles are formed from at least one of glass, carbon, aramid, and polymeric fibers. The glass may be any conventional glass composition, such as, for example, silica-based glass, borosilicate glasses such as E-glass, high-strength glass such as S-glass; H-glass, R-glass, E-type glass with lower amounts of boron or boron-free glass, and E-CR glass, (e.g., Advantex® glass available from Owens Corning). Although the following description is directed to the use of glass reinforcement fiber bundles, it is to be understood that any of the above-referenced reinforcement fiber bundles may be used in addition or in the alternative.

In some exemplary embodiments, the continuous glass fibers are formed by drawing molten glass filaments from a bushing and coating the glass filaments with a sizing composition prior to gathering the glass filaments into a bundle, forming a fiber bundle. In some exemplary embodiments, the filaments have a diameter of about 5 μm to about 40 μm, or from about 9 μm to about 33 μm, or about 17 μm to 24 μm.

The sizing composition may comprise any conventional sizing composition known in the art, such as Owens Corning SE 1500. In some exemplary embodiments, the sizing composition includes one or more of film forming agents, coupling agents, surfactants, dispersants, plasticizing agents, and optional additives.

The film-forming agent plays several roles in the sizing composition: it makes it possible to protect the glass filaments from abrasion during drawing, on the one hand, and the strand from attacks from chemicals and the environment, on the other hand; it also confers integrity on the strand. Additionally, the film formed may improve the compatibility of the sizing composition with the matrix to be reinforced.

The choice of the film-forming agent depends largely on the chemical nature of the material to be reinforced.

In some exemplary embodiments, the film-forming agent is selected from polyvinyl acetates (homopolymers or copolymers, for example, copolymers of vinyl acetate and of ethylene), polyesters, polyethers, epoxy compounds, polyacrylics (i.e., homopolymers or copolymers of derivatives of acrylic acid), polyurethanes, and mixtures thereof. The film-forming agent may be selected from polyvinyl acetates, epoxy compounds, polyurethanes, and mixtures thereof. In some exemplary embodiments, the content of film forming agent, based on the total solids content in the sizing composition is between 25% by weight and 85% by weight, or between 50% by weight and 75% by weight. The film-forming agent is generally introduced into the sizing composition in the form of an emulsion or a suspension.

The sizing composition may also comprise a surfactant, a plasticizing agent and/or a dispersing agent. The surfactants function to modify the surface tension and improve the wetting properties between the glass and the sizing components, as well as between the dry sizing film and the matrix material. The plasticizing agents function to influence the behavior of the film former by generally dropping the dry sizing film stiffness, temperature behavior, and the solubility in the matrix to reinforce. The dispersing agents function to improve the sizing stability in storage and during the sizing application on the glass filament. During the application of a sizing composition, a high shearing stress is generated that may be able to break the polymer emulsion if not correctly stabilized by a dispersing agent. Some components may combine several effects, such as for example surfactant and dispersing agent.

The surfactants, plasticizing agents, and dispersing agents may include aliphatic or aromatic polyalkoxylated compounds that are optionally halogenated, such as ethoxylated/propoxylated alkylphenols or ethoxylated/propoxylated fatty alcohols. These polyalkoxylated compounds can be block or random copolymers; amine-comprising compounds, for example amines, which are optionally alkoxylated, amine oxides, alkylamides, succinates and taurates, sugar derivatives, in particular of sorbitan, alkyl sulphates, which are optionally alkoxylated, alkyl phosphates and ether phosphates, which are optionally alkylated or alkoxylated. The sizings compositions may also include contain antistatic agents, such as specific organic cationic or non ionic agents, such as fatty quaternary amines or imidazolinium derivatives, to avoid static electricity accumulation due to friction on guiding devices, such as ceramic guiding eyes.

The total amount of surfactant, plasticizing agent, dispersing agent, or combinations thereof in the sizing composition (dry solids content) may be in the range from about 2% by weight to about 30% by weight, or from about 4% by weight to about 20% by weight of the dry solids content. In some exemplary embodiments, a surfactant is present in about 0.25% to 15% by weight of solids content. In some exemplary embodiments, a plasticizer is present in 0 to about 10% by weight of solids content. In some exemplary embodiments, a dispersing agent is present in about 0.1% to 15% by weight of solids content. In some exemplary embodiments a antistatic agents are present in 0 to 8% by weight of solids content.

The coupling agent facilitates the adhesion of the size to the surface of the glass by inducing covalent bond with the film forming agents. The coupling agents may further generate covalent bonding or at least an interpenetrated network with the polymeric matrix in the case of non reactive polymeric matrix. Another function of the coupling agents is to form a polysiloxane layer on the glass fiber that improves the durability in aggressive aging conditions like in wet, acidic or high temperature environment. The coupling agent may be a hydrolysable compound, for example a compound which can be hydrolyzed in the presence of an acid, such as acetic, lactic or citric acid. In one exemplary embodiment, the coupling agent is selected from silanes, such as γ-glycidoxypropyltrimethoxysilane, γ-acryloyloxypropyltrimethoxysilane, γ-methacryloyloxy-propyltrimethoxysilane, poly(oxyethylene/oxypropylene)-trimethoxysilane, γ-aminopropyltriethoxysilane, vinyltrimethoxysilane, phenylaminopropyltrimethoxy-silane, styrylaminoethylaminopropyltrimethoxysilane and tert-butylcarbamoylpropyltrimethoxysilane; siloxanes, such as 1,3-divinyltetraethoxydisiloxane; titanates; zirconates, in particular of aluminium; and mixtures thereof. The coupling agent may be a silane or a mixture of silanes. The amount of coupling agent in the sizing composition (dry extract solids content) may be in the range from about 2% to about 25% by weight, or from about 5% to 20% of the sizing dry matter content.

The sizing composition may optionally include one more additives. In some exemplary embodiments, the additives include fire retardants, nanoparticles, lubricants, such as a fatty acid ester, a fatty alcohol, fatty amine salts, a mineral oil, or mixtures thereof; complexing agents, such as an EDTA derivative, a gallic acid derivative or a phosphonic acid derivative; antifoaming agents, such as a silicone or a vegetable oil; a polyol; an acid used to control the pH during the hydrolysis of the coupling agent, for example acetic acid, lactic acid or citric acid; cationic polymers; emulsifiers; viscosity modifiers; stabilizers; acids; and other bases.

In some embodiments, the total content of additives in the sizing composition is in the range from about 0.1 to about 15% by weight, in some embodiments from 1 to 5% by weight (dry extract solids content).

In accordance with one aspect of the present invention, the sizing composition includes binder components, which may assist in the downstream production of the non-weft, unidirectional fabrics. In some exemplary embodiments, the sizing composition incorporates polymeric materials and a texturizing agent, as described in PCT/US2012/048937, filed Jul. 31, 2012, titled: Sizing Compositions and Methods of Their Use, the disclosure of which being fully incorporated by reference herein.

The binder components may include one or more polymeric binder materials, such as, for example, polyvinyl alcohol, polymer particles, and methylcellulose. In some exemplary embodiments, the polymer particles are selected from a polyamide, a polytetrafluoroethylene, a polyvinylchloride, a polyester, a polypropylene, a polyphenylenesulfide, a polyethyleneimine, a polyamideimine, a polyetheretherketone, a polyoxymethylene, a polyethylene, copolymers thereof, styrene and/or ethylene and/or propylene maleic or phtalic anhydride copolymers, and mixtures of the polymers and/or copolymers. In some embodiments the polymer comprises a polyamide or a mixture of polyamides.

In some exemplary embodiments, the binder particles include a texturing agent. The texturizing agent may be used to stabilize the sizing formulations. The texturing agent is capable of generating a thixotropic behavior of the sizing with a high static viscosity during the sizing storage and a very quick viscosity drop under shearing stress during the sizing application on the fibers.

In the case of sizing containing polymer particles, the distribution of the different binder component families is very different from conventional sizings, due to the potential high particle content. In some exemplary embodiments, the sizing components includes, by weight of dry extract solids content: about 10% to about 90% by weight polymer particles, about 0.1% to about 6% by weight of a texturizing agent, about 5% to about 60% by weight of a film-forming agent, about 0.1% to about 6% by weight of at least one compound selected from a surfactant, a plasticizing agent, a dispersing agent, and mixtures thereof, about 0.1% to about 10% by weight of a coupling agent, and 0 to about 15% by weight of at least one additive.

In some exemplary embodiments, one or more glass fibers are pulled together, forming a glass tow or fiber bundle for use in the formation of the non-weft, unidirectional fabric. The glass fiber bundle may take on any of a variety of shapes, as desired for a particular application. For example, the fiber bundle may have a flat shape, a round shape, an elliptical shape, or be split into multiple shapes. In some exemplary embodiments, the fiber bundles are shaped such that gaps and/or channels may be readily formed between parallel fiber bundles when the fiber bundles are formed into a fabric, to allow for impregnation between and around the fiber bundles by a matrix material. In some exemplary embodiments, the fiber bundles have a flat or rectangular shape.

In some exemplary embodiments, the non-weft unidirectional fabric includes a plurality of glass fiber bundles positioned in a substantially parallel alignment, with the longitudinal axis of the fiber bundles positioned in the forming direction. The substantially parallel fiber bundles may be adjacent to one another, or spaced apart, such that flow channels are formed between the individual fiber bundles. In some exemplary embodiments, the fiber bundles are free of any twist.

Conventional fabrics are formed by weaving fiber bundles in two perpendicular directions (i.e., warp and weft). Weaving the fiber bundles creates a mesh-like structure that binds a fabric together. Weaving, however, bends the fibers and reduces the maximum strength and stiffness that can be attained. Additionally, only the fiber bundles in the direction of the load (warp) contribute to the overall strength of a composite. The weft or cross-fibers, although contributing to the structure of a fabric are not load bearing. Therefore, the increased presence of weft fibers increases the weight of the fabric without contributing to the strength of the fabric formed. Additionally, the weft fibers reduce both the strength and modulus of a glass fabric, and ultimately a composite formed with the glass fabric.

Accordingly, some exemplary embodiments of the present invention provide a non-weft, unidirectional fabric formed by overlaying a veil on at least one side (i.e. upper or lower surface) of the one or more unidirectional glass fiber bundles. The non-woven veil functions to hold the fiber bundles in the particular placement desired, such as substantially parallel with flow channels disposed therebetween Referring to FIG. 1, the veil may comprise a non-woven veil 20, such as a non-woven glass or polymer veil. In some exemplary embodiments, the polymer veil 20 comprises thermoplastic filaments, such as polypropylene, polyester, polyamide, polyurethane, and combinations thereof. The non-woven veil 20 may comprise one or more continuous or short chopped fibers arranged randomly on the unidirectional fiber bundles. In some exemplary embodiments, the non-woven veil 20 is placed as an overlay on at least one surface of the unidirectional fiber bundles 14, as illustrated in FIG. 1. In some exemplary embodiments, the non-woven veil is placed as an overlay on the top surface of the unidirectional fiber bundles and also on the bottom surface of the fiber bundles. In other exemplary embodiments, the non-woven veil 20 is placed only on a single surface of the unidirectional fiber bundles 14. Placing the non-woven veil 20 only on a single surface improves the fabric's ability to shear as the fabric is manipulated, such as during the winding and unwinding process. Additionally, using a non-woven veil 20 only on a single surface reduces the overall production cost of the fabrics, while maintaining or improving the desirable properties.

The non-woven veil 20 may be formed by any traditional non-woven forming method, such as a melt-blown process, spun-bond process, dry-laid process, wet-laid process, or electro-spinning. During the spun-bond process, continuous filaments are extruded directly onto at least one surface of the substantially parallel fiber bundles. High pressure air from a pneumatic gun may be used to move and separate the filaments of the fiber bundles. The fibers of the non-woven veil may then be bonded to the fiber bundles by applying heated rollers or other heating mechanism to fuse the fibers together. In the case of a non-woven veil of thermoplastic filaments, heating the thermoplastic filaments partially melts the filaments, causing the filaments of the non-woven veil to bond to both the other filaments and the unidirectional fiber bundles that lie under the filaments.

Figure 2:
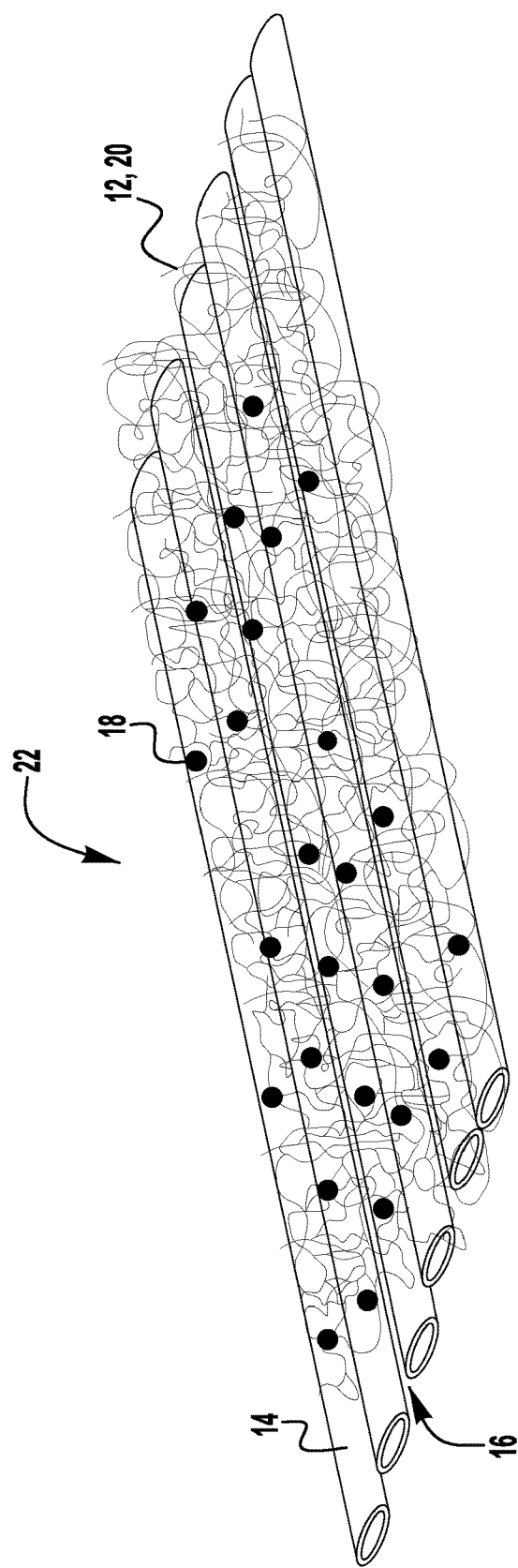
FIG. 2 illustrates a non-weft, unidirectional fabric including a non-woven veil selectively bonded to the glass fiber bundles by localized heating.

It has been discovered that bonding the non-woven veil 20 onto the entire surface of the unidirectional fiber bundles 14 may reduce the flexibility of the fabric produced, since the veil 20 may restrict the shear movement of the fiber bundles 14 against each other. This shear movement amongst the fiber bundles 14 is important for forming a conformable/drapeable material that can adapt to the shape of the surface of the mold, such as molds with curved surfaces. Accordingly, as illustrated in FIG. 2, filaments 12 of the non-woven veil 20 may be selectively bonded to the fiber bundles 14. For example, the filaments 12 may be heated by localized heating, creating selective bonding points 18. Localized heating only applies heat to certain areas of the non-woven veil 20. Therefore, only the particular filaments 12 that are exposed to heat will melt, such that only these localized areas of the filaments 12 of the non-woven veil 20 will bond to the unidirectional fiber bundles 14. By selectively bonding the filaments of the non-woven veil 20 to the fiber bundles 14, the fiber bundles retain the ability to shear, which is required in many applications, such as in the production of wind blades. This ability to shear is balanced by the ability to support the unidirectional structure and maintain the presence of channels 16 between the fiber bundles 14, as illustrated in FIGS. 1 and 2.

In some exemplary embodiments, the selective bonding points 18 have a diameter of about 1 mm or less. In some exemplary embodiments, a 10 cm×10 cm area of the non-weft unidirectional fabric 22 includes about 5 to 2000 selectively bonded points 18, or from about 50 to 500 selectively bonded points. In some exemplary embodiments, the selectively bonded points 18 are distributed in a defined manner to allow the unidirectional fiber bundles 14 enough elasticity to shear.

Alternatively, or in addition, the filaments 12 of the non-woven veil 20 may be bonded to the unidirectional fiber bundles 14 by the localized application of an adhesive material to the unidirectional fiber bundles 14 and/or the non-woven veil 20. The localized application of the adhesive material allows the filaments 12 of the non-woven veil 20 to selectively bond to the unidirectional fiber bundles 14, creating selective bonding points 18 similar to the selective bonding of the thermoplastic filaments by localized heating, described above. The adhesive material may be applied to the fiber bundles 14 as part of a sizing composition, or may be applied post-sizing.

In some exemplary embodiments, the non-woven veil 20 consists of a pre-bonded, thermoformable grid. The grid may be formed of glass or polymer fibers, pre-bonded in the formation of a grid. When the grid is a glass fiber grid, the glass fibers are first coated with a thermoplastic polymer material, prior to pre-bonding. The polymer fibers may be pre-bonded using heat alone. The pre-bonded, thermoformable grid may then be bonded to at least one surface of the unidirectional fiber bundles 14, providing a carrier for the fabric. In some exemplary embodiments, the grid is selectively bonded to the fiber bundles 14, as described above.

By selectively bonding the non-woven veil 20 to the unidirectional fiber bundles 14, a reduced amount of polymeric filaments and/or adhesive material is required. This reduces both the manufacturing cost and the weight of the unidirectional fabric produced. The non-woven veil provides a thin and low weight carrier for the unidirectional fiber bundles. Traditional carrier mats include about 20 grams or more of polymeric material per square meter, while the non-woven veil 20 of the present invention includes less than about 15 grams of polymeric material or less than about 5 grams of polymeric material, as determined by ISO 3374. In some exemplary embodiments, a 1000 gram non-woven, unidirectional veil comprises no more than 12 grams of polymeric material.

The non-woven veil 20 provides a carrier for the unidirectional fiber bundles 14, thus eliminating the need for the structural support of weft fibers. In some exemplary embodiments, at least 80% of the fibers in the fabric 22 are unidirectional fibers 14. In other exemplary embodiments, at least 90%, or at least 95% of the fibers in the fabric 22 are unidirectional fibers 14. In yet other exemplary embodiments, about 100% of the glass fibers in the fabric 20 are unidirectional fibers 14.

Figure 3A:
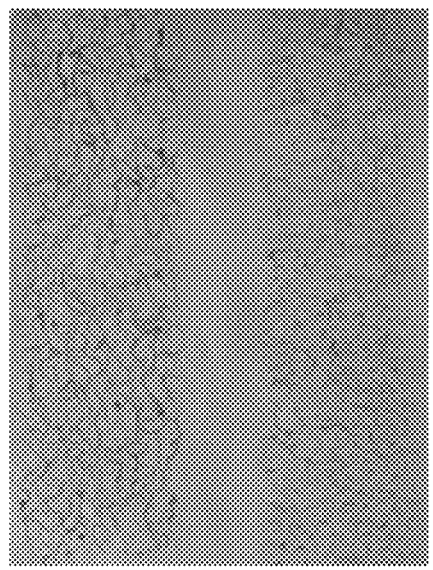
FIG. 3(a) illustrates a unidirectional fabric formed by applying an adhesive to unidirectional fiber bundles.
Figure 3B:
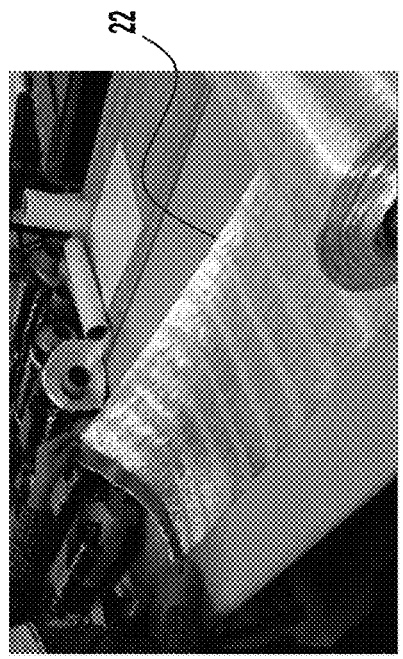
FIG. 3(b) illustrates the ability to control the pattern of adhesive application.
Figure 3C:
FIG. 3(c) illustrates an exemplary sinusoidal nozzle (left) and an exemplary patterned nozzle (right).
Figure 3D:
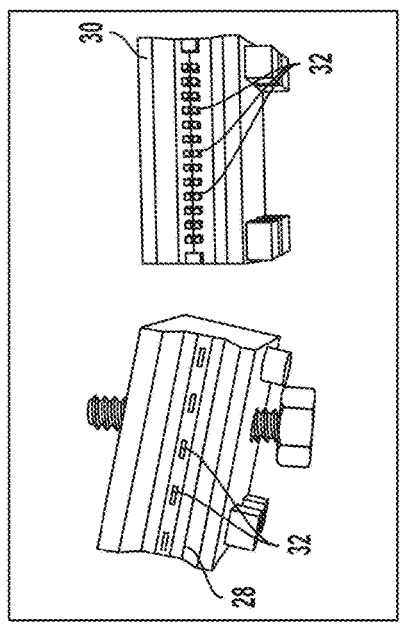
FIG. 3(d) illustrates an exemplary non-weft, unidirectional fabric sample with intermittent spray bands of adhesive on both sides undergoing a handling test.

Referring to FIG. 3A, in some exemplary embodiments, in lieu of or in addition to a non-woven veil 20, the unidirectional fabric 22 is formed by intermittently spraying adhesive patterns 24 on at least one surface of the unidirectional fiber bundles. The adhesive spray may comprise a thermoplastic material that is compatible with the epoxy or polyester-compatible sizing chemistry applied to the glass fibers during formation. In some exemplary embodiments, the adhesive has a shear viscosity of about 2,000 to about 6,000 cps at application temperature of about 250° F. to about 450° F. that filamentizes to less than 50 micron as it sprays into a web on at least one surface of the unidirectional fabric. To apply the adhesive, the unidirectional fiber bundles are held under tension with gaps of a predetermined width between each bundle. As the adhesive is applied, it solidifies and holds the fiber bundles in place, thus maintaining the gaps between the bundles. The spray may be intermittently spaced to enable rolling of the unidirectional fabric and to allow the fabric to skew without distortion. The intermittent spacing or pattern of the adhesive spray may be predetermined by controlling a variety of parameters, including but not limited to the dimension and design of the spray head used to apply the adhesive; the number, dimension, spacing and/or orientation of spray orifices 32 of the spray head; the air pressure of the air supplied to the spray head; the hydraulic pressure of the adhesive supplied to the spray head; and/or by controlling the desired increments at which the adhesive is sprayer. For instance, various nozzles may be used that have different orifice 32 sizes and/or number of orifices 32 per nozzle, to adjust the output of the spray adhesive. For example, a patterned spray nozzle may be used that directs adhesive in the form of discrete patterns of random combinations of polymer fiber and polymer dots with high variation onto the fabric 22. In additional embodiments, a sinusoidal pattern spray nozzle may be used that directs adhesive in a continuous extrusion polymer fiber-looking adhesive pattern onto the fabric 22, usually without spray polymer dots. Referring to FIG. 3(c), an exemplary sinusoidal pattern spray nozzle 28 and patterned spray nozzle 30, each having a plurality of spray orifices 32 are shown. FIG. 3(a) illustrates a unidirectional fabric 22 formed by applying an adhesive in adhesive bands 24 to the fabric 22 using a sinusoidal spray nozzle (left) and a patterned nozzle (right). FIG. 3(b) further demonstrates the ability to control the pattern of sinusoidal adhesive application, with a thicker/coarser adhesive application pattern being displayed on the top half of the Figure and a finer application on the bottom half of the Figure. FIG. 3(d) illustrates a unidirectional fabric 22 formed by intermittently spraying bands of adhesive 24 on both sides (i.e., top surface and bottom surface) of the unidirectional glass bundles 14.

In some exemplary embodiments, the adhesive comprises one or more of polyolefin, amorphous poly-alpha-olefin ("APAO"), polypropylene, maleated polypropylene, polyester, co-polyester, polyamide, co-polyamide, polyurethane, epoxy or phenolic base polymer. Exemplary adhesive compounds are listed in Table 1 below.

TABLE 1

| Chemistry | Softening point (° F.) | Viscosity at 350° F. (cps) |
|---|---|---|
| APAO | 163 | 1200 |
| APAO | 303 | 4000 |
| APAO | 267 | 3700 |
| APAO | 305 | 2000 |

The amorphous poly-alpha-olefins may be grafted or modified with maleic anhydride to improve adhesion with polar substances, such as the sizing components or epoxy resin of the composite matrix. By grafting maleic anhydride on the APAO polymer, the softening point of the adhesive compound may be reduced. For example, based on 7% maleic anhydride in the base polymer, the melting point ranges from 160-320° F. and the viscosity ranges from 100-2000 mPas, which would reduce the softening point of APAO.

In some exemplary embodiments, the non-weft unidirectional fabric 22 comprises unidirectional fiber bundles 14 having at least one surface selectively bonded to a non-woven veil 20. In other exemplary embodiments, the non-weft unidirectional fabric 22 comprises unidirectional fiber bundles 14 that are bonded together using a polymeric binder in the sizing composition used to coat the glass fibers. In yet other exemplary embodiments, the non-weft, unidirectional fabric 22 comprises unidirectional fiber bundles 14 bonded together using a polymeric binder in the sizing composition used to coat the glass fibers and having at least one surface selectively bonded to a non-woven veil 20. In yet other exemplary embodiments, the non-weft unidirectional fabric 22 comprises collimated unidirectional fiber bundles 14 intermittently coated with a spray adhesive 24, with or without the further addition of a non-woven veil 20. Such non-weft unidirectional fabrics 22 improve both the strength and modulus of conventional unidirectional fabrics by removing the weft fibers that do not contribute to the mechanical properties of the fabric. Therefore, reducing the amount of weft in a fabric proportionally increases the mechanical properties of the fabric. For example, by reducing the amount of weft by 5% each of the strength and modulus of the fiber are improved by at least 5%.

The non-weft unidirectional fabric 22 may be used to form preforms, which includes stacking several layers of the non-weft, unidirectional in defined orientations. The dry stacked non-weft unidirectional fabrics 22 may then be reheated to bond the unidirectional fabric, at least partially. As was described above, the non-weft, unidirectional fabrics may be selectively bonded, by localized re-heating or by application of an adhesive. The preform may then be placed in a mold and impregnated with a matrix resin, forming a composite.

In some exemplary embodiments, one or more layers of the non-weft, unidirectional fabric 22 are stacked, as illustrated in FIG. 4, and impregnated with a matrix material to form a unidirectional fabric reinforced composite 26. The impregnation by the matrix material may occur by any traditional impregnation/infusion process, such as a vacuum assisted transfer molding process, wherein a liquid resin is pulled into a cavity under vacuum, or resin transfer molding, in which pressure is used to force liquid resin into dry reinforcements that have been laid in a sealed mold. To accomplish matrix infusion by vacuum, the resin must be able to permeate the fabric layers, as illustrated in FIG. 4. As shown in FIG. 4, the non-woven veil 20 helps to create and maintain channels 16 in the non-weft unidirectional fabric by holding the unidirectional fiber bundles a fixed width apart. In other exemplary embodiments, as the thermoplastic veil 20 is heated above its plasticity/elasticity point and pressed into the unidirectional fiber bundles 14 during lamination, the veil 20 may create channels 16 between the individual fiber bundles, as illustrated in FIG. 1.

Resin infusion under a vacuum is a dynamic process wherein the vacuum causes the plies to condense, thus making it difficult to achieve proper resin infusion through the thickness of multiple fabric plies. Accordingly, forming the unidirectional fabrics using a spray adhesive works to further improve the resin infusion, since the adhesive spray does not completely cover the unidirectional fabrics, but rather forms spaced apart bands with controlled widths across multiple unidirectional fiber bundles. Additionally, the cured adhesive acts as a structural adhesive, which, in addition to proving adhesion between the fiber bundles and the epoxy resin, provides a three dimensional stiffness capable of maintaining the gaps between adjacent glass bundles 14 to allow for increased resin permeability through the thickness of multiple plies. FIG. 5A illustrates a 0° infusion of 4 plies of unidirectional fabric 22. FIG. 5(B) illustrates a 0° infusion of 4 plies of unidirectional fabric that have been infused with resin under vacuum using a vacuum molding apparatus 34, forming a non-weft, unidirectional fabric reinforced composite 26.

In some exemplary embodiments, the rate of permeability is pre-established by arranging the reinforcing fibers to either increase or decrease the permeability of the fabrics. The rate of permeability may be increased or decreased by adjusting the spacing of fiber bundles 14 within one monolayer ply, thereby forming channels 16. In some exemplary embodiments, the channels 16 have a cross-sectional diameter of less than 1 mm. In some exemplary embodiments, the rate of permeability is pre-established to provide full impregnation by the resin in between and around the fiber bundles 14, such that each of the fibers is bonded together.

The matrix material may include any thermoset or thermoplastic matrix material suitable for a particular application. Suitable thermoplastic resins useful with the present invention in the above molding processes include polyesters (including copolyesters), for example, polyethylene terephthalate, polyamides, polyolefins, and polypropylene, PEEK, etc. Thermosetting resins that are useful include phenolic resins, epoxy resins, vinyl ester resins, polyurethane, and unsaturated polyester resins.

The non-weft, unidirectional fabric reinforced composites 26 may be used to form products in a number of industries. For example, the composites may be used in wind energy, for use in wind turbine blades, or automotives.

The general inventive concepts have been described above both generically and with regard to various exemplary embodiments. Although the general inventive concepts have been set forth in what is believed to be exemplary illustrative embodiments, a wide variety of alternatives known to those of skill in the art can be selected within and are encompassed by the disclosure. The general inventive concepts are not otherwise limited, except for the recitation of the claims set forth below. As will be appreciated by those skilled in the art, the sizing compositions, sized fibers, and composite materials incorporating such fibers according to the present invention may be practiced in a variety of embodiments and methods not explicitly disclosed herein by modifying the basic compositions and methods in accord with the principles outlined herein. In particular, the concentrations and constituents of the various examples provided below may be combined and altered within the general compositional parameters to provide a large variety of size compositions in accord with the present invention. Thus, the following examples are meant to better illustrate the present invention, but are in no way intended to limit the general inventive concepts of the present invention.

EXAMPLES

The following examples describe the performance of various exemplary embodiments of the non-weft unidirectional fabric of the present invention.

Example 1

Non-weft unidirectional fabrics were prepared by laying a glass veil backing on one side of unidirectional fiber bundles. No binder was used in the non-weft unidirectional fabrics. One unidirectional fabric included fibers with a 17 micron diameter and one included fibers with a 24 micron diameter. A commercial grade epoxy matrix resin was then used to laminate the fabrics. Comparative structures were also prepared using weft fibers, rather than a glass veil. Additional variables include twisted fiber bundles vs. fiber bundles without twist and Owens Corning Advantex® glass vs. Owens Corning H-glass.

Figure 6:
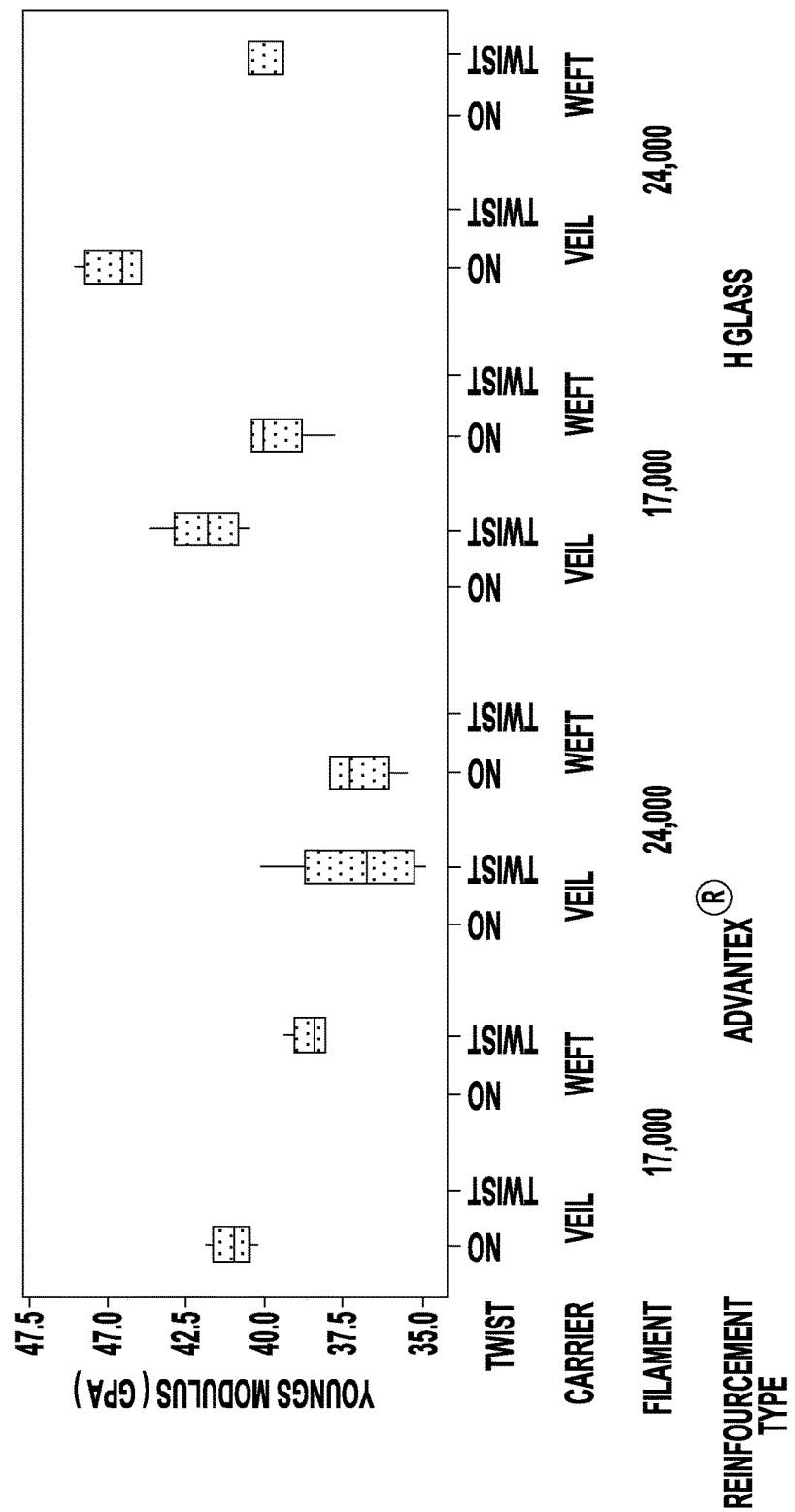
FIG. 6 graphically illustrates the static tensile Young's modulus (Gpa) in the main fiber direction normalized to a 50% fiber volume fraction for a variety of different unidirectional fabrics.

FIG. 6 illustrates the static tensile Young's modulus in the main fiber direction, normalized to a 50% fiber volume fraction. As demonstrated in FIG. 6, the non-weft, unidirectional fabrics for each glass type, Advantex® and H-glass, are capable of achieving a higher Young's modulus than comparable fabrics formed with weft fibers. The highest Young's modulus, about 45 Gpa, was found in non-weft unidirectional laminates formed using non-twisted H-glass fiber bundles and a glass veil backing.

Figure 7:
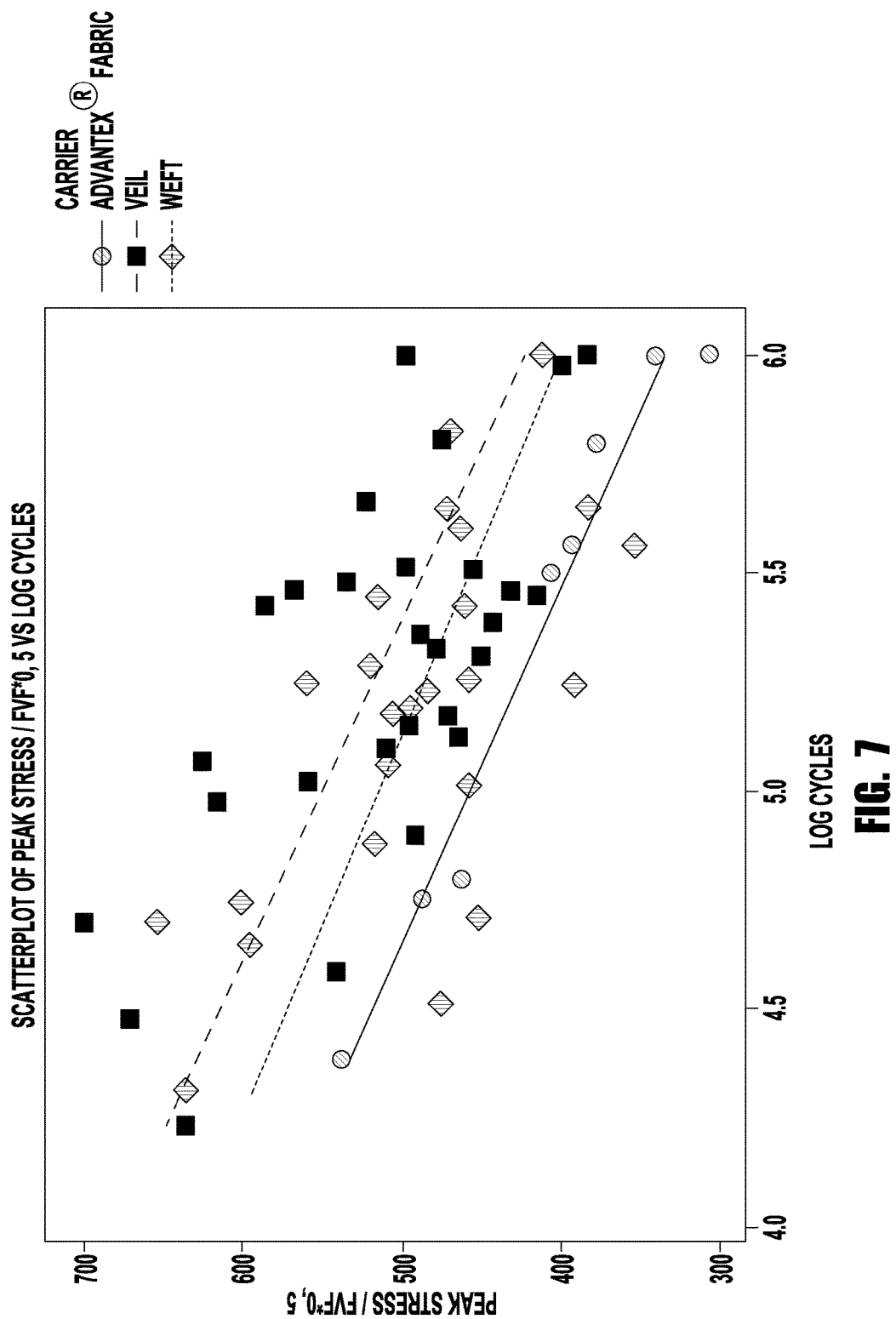
FIG. 7 graphically illustrates the fatigue demonstrated at a load ratio of R=0.1 with tensile strength normalized to 50% fiber volume fraction versus load cycle for a variety of different unidirectional fabrics.

FIG. 7 illustrates the fatigue of both the weft and non-weft unidirectional laminates described above, with a load ratio R=0.1 and with tensile strength normalized to 50% fiber volume fraction. Each mark on the graph represents a rupture after a particular number of load cycles. The fatigue testing was carried out according to DTU proprietary testing method published in the Journal of Composite Materials. (Bronsted et al., *Fatigue damage propagation in unidirectional glass fiber reinforced composites made of a non-crimp fabric. Journal of Composite Materials*, Sep. 13, 2009). The examples in FIG. 7 are distinguished by the use of a glass veil vs. weft fibers as a backing material. Additionally, standard unidirectional knitted fabric (Advantex® fiber) is included and indicated by the solid black line.

As demonstrated in FIG. 7, the knitting structures of the knitted fabric decreases the fatigue performance as compared to both weft and veil backings Additionally, the veil backing further improves the fatigue performance compared to a weft backing.

Figure 8:
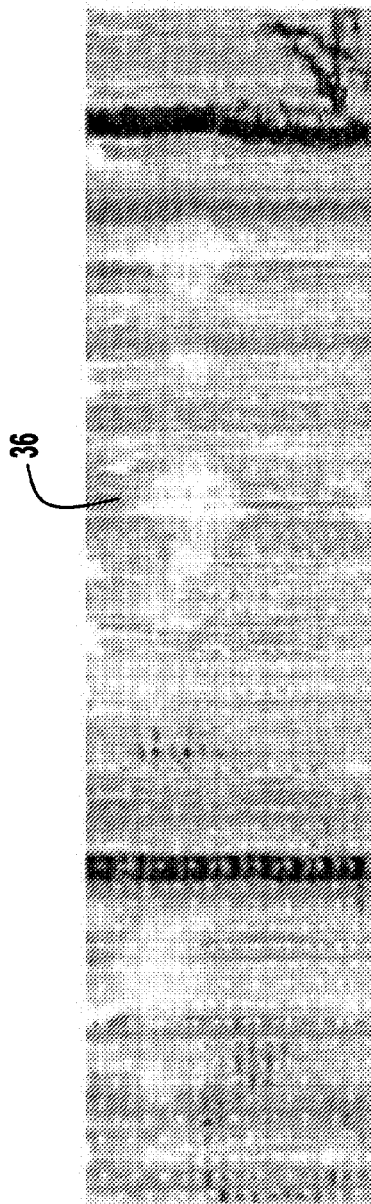
FIG. 8 is a macroscopic illustration of the damage sustained by a glass-reinforced composite including a weft fabric formed with a glass non-woven carrier after fatigue testing (dynamic load).
Figure 9:
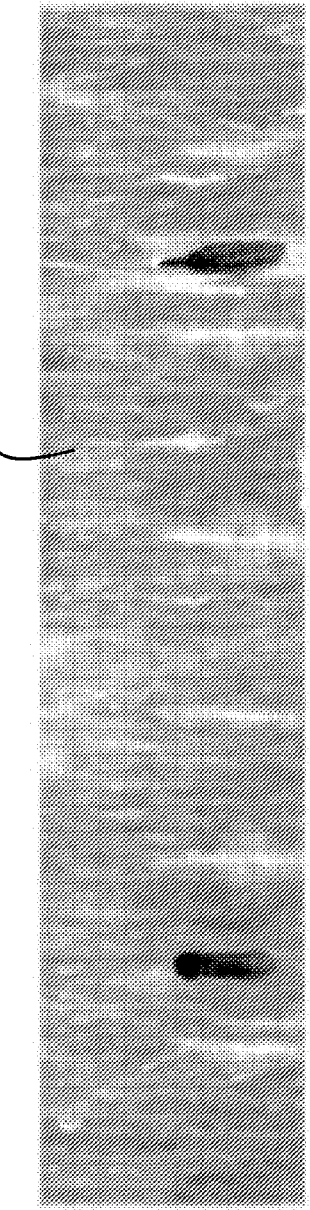
FIG. 9 is a macroscopic illustration of the damage sustained by a glass-reinforced composite including a non-weft, unidirectional fabric with a glass non-woven carrier after fatigue testing (dynamic load).

FIGS. 8 and 9 provide macroscopic photographs illustrating the damage to laminates after fatigue testing. FIG. 8 shows the damage to the unidirectional laminate with a weft carrier backing 36. The damage is visible as the whitish areas that are unevenly dispersed over the entire laminate 36. These areas of damage cause premature rapture. In contrast, FIG. 9 illustrates the damage to the non-weft unidirectional laminate 38 with a glass non-woven laid on one side of the unidirectional fiber bundles. As shown in FIG. 9, the damage is evenly dispersed over the entire area of the laminate 38, which lessens the chance of premature rapture.

Example 2

In another example, collimated unidirectional glass bundles with gaps between each adjacent bundle were coated on both sides with an APAO adhesive composition, which had a high tensile strength and low residual tack. The unidirectional fabrics formed were then stacked 4 plies thick and vacuum infused with an epoxy resin. The unidirectional laminates were then tested for mechanical properties in both the 0° and 90° directions, including tensile modulus, tensile strength, strain, interlaminar shear strength, flexural strength, and flexural modulus. A dynamic mechanical analysis was also conducted and the loss on ignition was measured. Table 2, below, illustrates the mechanical testing results for samples that were prepared by applying ~1-2 mm beads of an adhesive with varying separation distances between adhesive band/bead.

TABLE 2

| Adhesive Bead | Resin % LOI | 0° Strength (MPa) | 0° Modulus (MPa) | Strain (%) |
| --- | --- | --- | --- | --- |
| 1 inch separation | 29.45 ± 0.94 | 834 ± 50 | 40411 ± 3507 | 2.4 ± 0.48 |
| 2 inch separation | 25.43 ± 0.58 | 974 ± 37 | 46822 ± 5226 | 2.3 ± 0.26 |
| 3 inch separation | 25.15 ± 1.35 | 1058 ± 88 | 50911 ± 5881 | 2.3 ± 0.21 |

As illustrated in Table 2, the amount of epoxy resin used decreases as the amount of adhesive is increased, which indicates that the presence of adhesive influences resin infusion in that less resin is needed. Additionally, the tensile strength and modulus of the laminates increased as the amount of adhesive decreased and the glass content was increased. Accordingly, a balance must be achieved between the amount of adhesive for handling versus obtaining maximum strength and modulus in a laminate.

It is to be understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

The invention claimed is:

1. A non-weft, unidirectional fabric comprising:
   a plurality of substantially parallel reinforcement glass fiber bundles formed from a plurality of glass filaments having diameters of about 5 μm to about 40 μm coated with a sizing composition including a polymeric binder, wherein said polymeric binder is capable of bonding said glass filaments to each other, said reinforcement fiber bundles having a first surface and an opposing second surface, each of the first surface and opposing second surface having a width, said glass fiber bundles being spaced apart, forming flow channels between said fiber bundles; and
   a non-woven veil selectively bonded to at least one of said first and second surface by at least one of localized heating of the non-woven veil or localized application of an adhesive material.

2. The non-weft, unidirectional fabric of claim 1, non-woven veil is a glass veil, a polymer veil, or mixtures thereof.

3. The non-weft, unidirectional fabric of claim 2, wherein said polymer veil comprises at least one of polypropylene, polyester, polyamide, and polyurethane filaments.

4. The non-weft, unidirectional fabric of claim 1, wherein said non-woven veil is formed by one of a melt-blown process, a spun-bond process, a dry-laid process, a wet-blown process, and electro-spinning.

5. The non-weft, unidirectional fabric of claim 1, wherein said non-woven veil is selectively bonded to said at least one of the first and second surfaces by localized heating of said non-woven veil.

6. The non-weft, unidirectional fabric of claim 1, wherein said non-woven veil is selectively bonded to said at least one of the first and second surfaces by a localized application of an adhesive material.

7. The non-weft, unidirectional fabric of claim 1, wherein at least 80% of said reinforcement fiber bundles are parallel to one another.

8. The non-weft, unidirectional fabric of claim 1, wherein said polymeric binder includes one or more of a polyamide, a polytetrafluoroethylene, a polyvinylchloride, a polyester, a polypropylene, a polyphenylenesulfide, a polyethyleneimine, a polyamideimine, a polyether-etherketone, a polyoxymethylene, a polyethylene, copolymers thereof, and mixtures of said polymers and/or copolymer.

9. A fiber-reinforced composite comprising:
   at least one non-weft, unidirectional fabric comprising:
      a plurality of substantially parallel reinforcement fiber bundles formed from a plurality of glass filaments having diameters of about 5 μm to about 40 μm coated with a sizing composition including a polymeric binder, wherein said polymeric binder is capable of bonding said glass filaments to each other, said reinforcement fiber bundles having a first surface and an opposing second surface, each of the first surface and opposing second surface having a width, said glass fiber bundles being spaced apart, forming flow channels between said fiber bundles; and
      a non-woven veil selectively bonded to at least one of said first and second surface by at least one of localized heating of the non-woven veil or localized application of an adhesive material, and
   a polymeric matrix material.

10. The fiber-reinforced composite of claim 9, wherein said reinforcement fiber bundles are at least one of glass and carbon fiber bundles.

11. The fiber-reinforced composite of claim 9, wherein said polymeric matrix material includes one or more of polyesters, polyethylene terephthalate, polyamide, polyolefin, polypropylene, polyamide, phenolic resin, epoxy, and vinyl ester.

12. The fiber-reinforced composite of claim 9, wherein said non-woven veil is a glass veil, a polymer veil, or mixtures thereof.

13. The fiber-reinforced composite of claim 9, wherein said non-woven veil is selectively bonded to said at least one surface by localized heating of said non-woven veil.

14. The fiber-reinforced composite of claim 9, wherein said fiber-reinforced composite is one of a wind blade and an automotive part.

15. A non-weft, unidirectional fabric comprising:
   a plurality of substantially parallel reinforcement glass fiber bundles formed from a plurality of glass filaments having diameters of about 5 μm to about 40 μm coated with a sizing composition including a polymeric binder, wherein said polymeric binder is capable of bonding said glass filaments to each other, said reinforcement glass fiber bundles having a first surface and an opposing second surface, each of the first surface and opposing second surface having a width, said glass fiber bundles being spaced apart, forming flow channels between said fiber bundles; and
   one or more bands of sprayable adhesive spanning at least a portion of the width at least one of the first and second surfaces of the plurality of substantially parallel reinforcement fibers, wherein said sprayable adhesive having a shear viscosity of about 2,000 to about 6,000 cps at a temperature of about 250° F. to 450° F.

16. The non-weft, unidirectional fabric of claim 15, wherein said sprayed adhesive comprises one or more of polyolefin, amorphous poly-alpha-olefin ("APAO"), polypropylene, maleated polypropylene, polyester, co-polyester, polyamide, co-polyamide, polyurethane, epoxy, or phenolic base polymer.

* * * * *